July 7, 1931.  F. J. STOCKBURGER  1,812,995
TRUCK AND TRAILER
Filed July 28, 1930  3 Sheets-Sheet 2
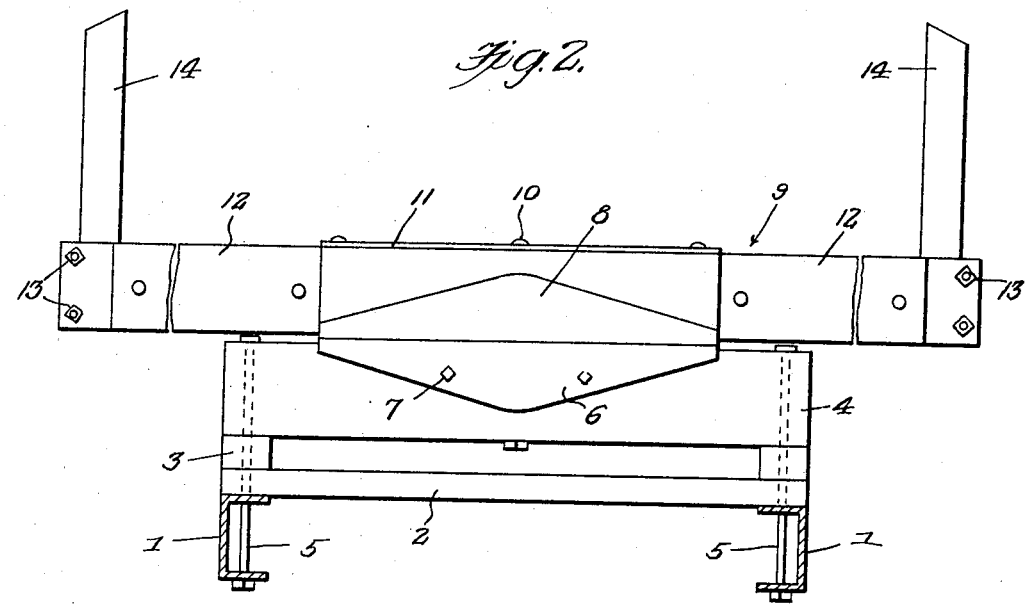
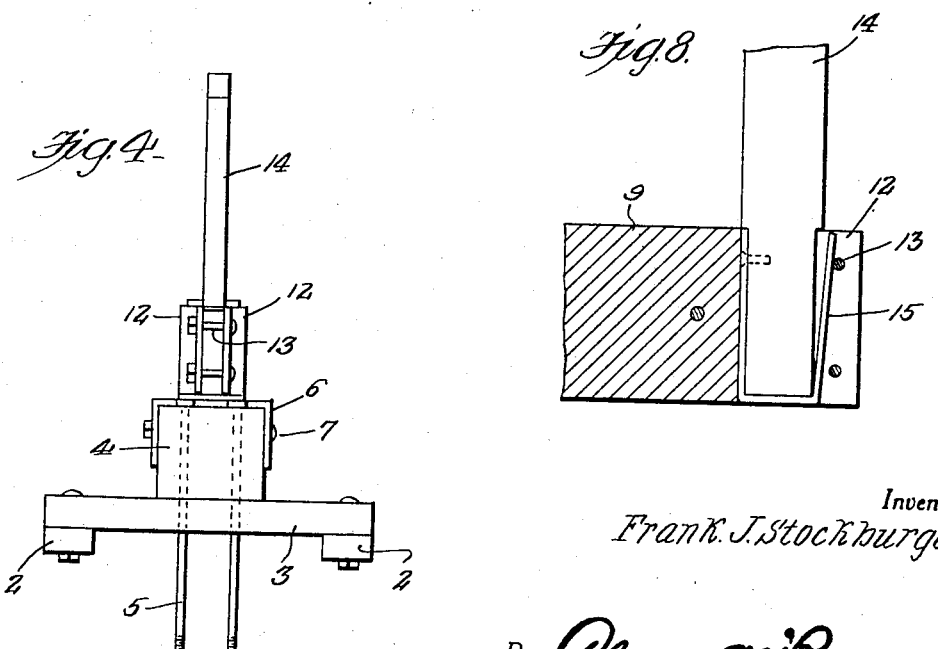
Inventor
Frank J. Stockburger,
By Clarence A. O'Brien
Attorney July 7, 1931.  F. J. STOCKBURGER  1,812,995
TRUCK AND TRAILER
Filed July 28, 1930  3 Sheets-Sheet 3
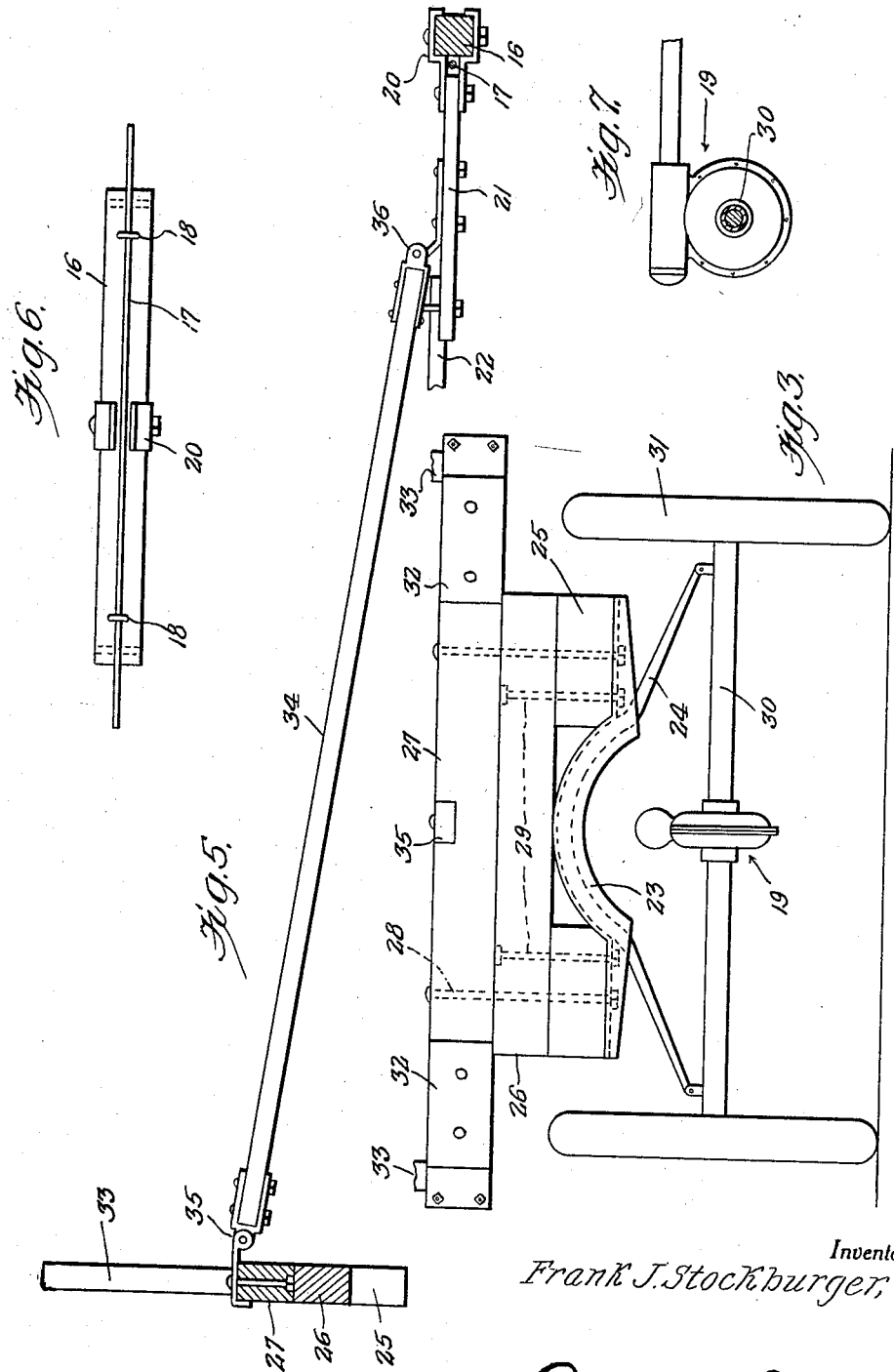
Inventor
Frank J. Stockburger,
By Clarence A. O'Brien
Attorney Patented July 7, 1931

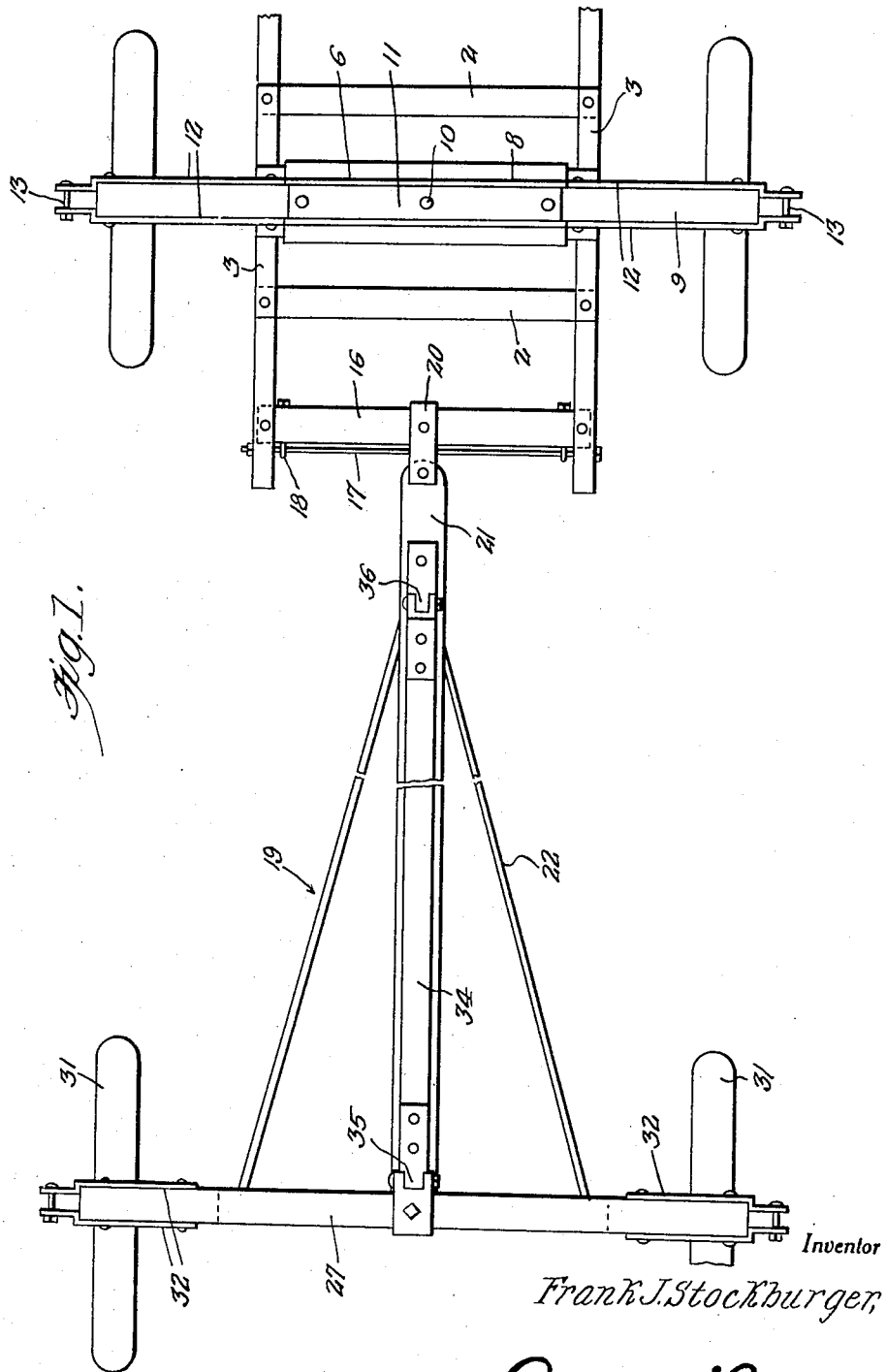

1,812,995

UNITED STATES PATENT OFFICE

FRANK J. STOCKBURGER, OF TOSTON, MONTANA

TRUCK AND TRAILER

Application filed July 28, 1930. Serial No. 471,284.

This invention relates to a truck and trailer therefor and has for its primary object to provide, in a manner as hereinafter set forth, an apparatus of the aforementioned character embodying the novel construction or bolsters for mounting on the truck chassis and on the trailer.

Other objects of the invention are to provide a structure of the aforementioned character, which will be simple in construction, strong, durable, efficient in its use, and which may be manufactured at low cost.

All of the foregoing and still further objects and advantages of the invention may become apparent from a study of the following specification, taken in connection with the accompanying drawings, wherein like characters of reference designate corresponding parts throughout the several views, and wherein:

Figure 1 is a top plan view showing a truck and trailer construction in accordance with this invention.

Figure 2 is a view in section through the chassis of the truck frame showing the bolster mounted in position thereon.

Figure 3 is a view in rear elevation of the trailer showing the bolster constituting an important feature of this invention mounted in position thereon.

Figure 4 is a view in side elevation of the bolster illustrated in Figure 2 of the drawings, the same being shown removed from the truck chassis.

Figure 5 is a sectional view showing the brace for the trailer bolster.

Figure 6 is a view in rear elevation showing the bar which is rigidly secured across the rear end portion of the truck frame and to which the trailer is connected.

Figure 7 is a fragmentary detail view in section showing the usual construction of the driving mechanism of the trailer wheels, said trailer being formed from the rear construction of a motor vehicle.

Figure 8 is a fragmentary sectional view showing the means of mounting the standard on the opposite ends of the bolsters.

Referring to the drawings in detail, it will be seen that the reference numerals 1 designate the usual longitudinal side members of a truck chassis which are of the usual configuration and have mounted thereon the transverse filler strips 2 which constitute a portion of the present invention.

Longitudinally extending bars 3 are disposed on the side members 1 of the chassis and also on the opposite end portions of the filler strips 2, the filler strips being utilized to support the bars 3 at low portions in the side members 1.

A cross beam 4 of appropriate dimensions rests transversely on the bars 3 and is anchored by the bolts 5 to the frame members 1. A channel shaped wear plate 6 is saddled on the beam 4 and anchored by suitable bolts 7.

A channel shaped wear plate 8 is disposed on top of the plate 6 and mounted therein is the bolster 9. A pivot bolt 10 extends through the metallic strip 11 on top of the bolster 9 and then through said bolster and the plates 6 and 8 and the beam 4.

Metallic plates 12 are mounted on the opposite sides of the bolster 9 and project from the opposite ends thereof. The portions of the plates 12 which are free of the bolster 9 are inwardly offset and have the bolts 13 extending therebetween. Standards 14 are detachably inserted between the projecting end portions of the plates 12 and have mounted thereon the resilient keeper arms 15 which are adapted to yieldingly engage the bolts 13 to retain the standards in position and prevent rattling thereof.

A cross bar 16 has its opposite ends anchored in the side members 1 adjacent the rear ends of said side members. A metallic rod 17 is disposed parallel with the bar 16 and also has its opposite ends anchored in the side members 1 of the chassis. The rod 17 is connected to the bar 16 by the eye bolts 18 and said rod serves to strengthen the bar 16.

A trailer designated generally by the reference numeral 19 is connected to the bar 16 through the medium of the clevis 20 which is rigidly mounted to said bar 16 and pivotally connected to the tongue 21 of the trailer. The usual brace rods 22 also constitute a part of the trailer 19. Mounted on the substantially horizontally disposed opposite end portion of the channelled bar 23 which is mounted on the spring 24 of the trailer is a pair of blocks 25 which, in turn, support the beam 26.

The bolster 27 is rigidly mounted on the beam 26 by the bolts 28 which extend through said bolster, the beam 26, the blocks 25 and have their lower ends anchored in the bar 23. The beam 26 and the blocks 25 are anchored on the bar 23 by the bolts 29. The reference numeral 30 designates the axle housing of the trailer which is mounted on the wheels 31. Socket forming plates 32 of a construction identical to the plates 12 are disposed in pairs on the opposite end portions of the bolster 27 for supporting the standards 33.

A brace 34 has its rear end pivotally connected to the bolster 27 by the hinge 35 (see Figure 5) and its forward end connected to the tongue 21 by the hinge 36.

It is believed that the many advantages of a truck and trailer constructed in accordance with the present invention will be readily understood, and although the preferred embodiment of the invention is as illustrated and described, it is to be understood that changes in the details of construction may be had which will fall within the scope of the invention as claimed.

What is claimed is:

1. In combination with the side members of the chassis of a motor vehicle, a number of spaced cross bars supported on the rear portion of said side members, a pair of longitudinally extending members resting on the ends of said cross bars, a cross beam having its ends resting on an intermediate portion of the longitudinally extending members, bolts passing through the ends of the cross beams, portions of the longitudinally extending members, a cross bar and the said side members of the chassis, an inverted channel shaped plate straddling the central portion of the cross beam, a bolster, a channel shaped plate straddling the central portion of the lower part of said bolster, a pivot bolt passing through the central part of the bolster, the two channel plates and the cross beam, a second bolster, a cross beam to which the second bolster is attached, an axle supporting the said beam, wheels carried by the ends of the axle, a tongue connected with the supporting beam of the second bolster, and means for pivotally connecting the front end of the tongue to one of the cross bars which are connected with the side members of the chassis.

2. In combination with the side members of the chassis of a motor vehicle, a number of spaced cross bars supported on the rear portion of said side members, a pair of longitudinally extending members resting on the ends of said cross bars, a cross beam having its ends resting on an intermediate portion of the longitudinally extending members, bolts passing through the ends of the cross beam, portions of the longitudinally extending members, a cross bar and the said side members of the chassis, an inverted channel shaped plate straddling the central portion of the cross beam, a bolster, a channel shaped plate straddling the central portion of the lower part of said bolster, a pivot bolt passing through the central part of the bolster, the two channel plates and the cross beam, a second bolster, a cross beam to which the second bolster is attached, an axle supporting the said beam, wheels carried by the ends of the axle, a tongue connected with the supporting beam of the second bolster, and means for pivotally connecting the front end of the tongue to one of the cross bars which are connected with the side members of the chassis, each bolster having a recess at each end thereof, a standard fitting in each recess, each standard having a spring plate connected at its lower end with a part of the spring plate extending outwardly from the bolster and a pin passing through the recess and yieldably engaged by the spring plate.

In testimony whereof I affix my signature.

FRANK J. STOCKBURGER.